United States Patent
Yi et al.

(10) Patent No.: US 11,030,481 B2
(45) Date of Patent: Jun. 8, 2021

(54) METHOD AND APPARATUS FOR OCCLUSION DETECTION ON TARGET OBJECT, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Cheng Yi, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 94 days.

(21) Appl. No.: 16/545,017

(22) Filed: Aug. 20, 2019

(65) Prior Publication Data

US 2020/0034657 A1 Jan. 30, 2020

Related U.S. Application Data

(63) Continuation of application No. PCT/CN2018/090994, filed on Jun. 13, 2018.

(30) Foreign Application Priority Data

Jul. 27, 2017 (CN) .......................... 201710625671.0

(51) Int. Cl.
*G06K 9/62* (2006.01)
*G06K 9/00* (2006.01)
*G06K 9/32* (2006.01)

(52) U.S. Cl.
CPC ....... *G06K 9/6252* (2013.01); *G06K 9/00248* (2013.01); *G06K 9/00281* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 7,804,983 B2 * | 9/2010 | Steinberg | ........... | G06K 9/00308 382/118 |
| 7,995,795 B2 * | 8/2011 | Steinberg | ........... | G06K 9/00228 382/103 |

(Continued)

FOREIGN PATENT DOCUMENTS

| CN | 105827979 A | 8/2016 |
|---|---|---|
| CN | 106503625 A | 3/2017 |

OTHER PUBLICATIONS

The World Intellectual Property Organization (WIPO) International Search Report for PCT/CN2018/090994 dated Sep. 18, 2018 5 Pages (including translation).

(Continued)

*Primary Examiner* — Tsung Yin Tsai
(74) *Attorney, Agent, or Firm* — Anova Law Group, PLLC

(57) ABSTRACT

A method for occlusion detection on a target object is provided. The method includes: determining, based on a pixel value of each pixel in a target image, first positions of a first feature and second positions of a second feature in the target image. The first feature is an outer contour feature of a target object in the target image, the second feature is a feature of an interfering subobject in the target object. The method also includes: determining, based on the first positions, an image region including the target object; dividing,
(Continued)

based on the second positions, the image region into at least two detection regions; and determining, according to a pixel value of a target detection region, whether the target detection region meets a preset unoccluded condition, to determine whether the target object is occluded. The target detection region is any one of the at least two detection regions.

20 Claims, 10 Drawing Sheets

(52) U.S. Cl.
CPC ......... *G06K 9/3241* (2013.01); *G06K 9/6257* (2013.01); *G06K 9/6261* (2013.01); *G06K 9/6269* (2013.01); *G06K 2209/23* (2013.01)

(56) References Cited

U.S. PATENT DOCUMENTS

| | | | | |
|---|---|---|---|---|
| 8,494,233 | B2* | 7/2013 | Kaneda | G06K 9/00281 |
| | | | | 382/118 |
| 8,836,777 | B2* | 9/2014 | Mehra | G06F 3/013 |
| | | | | 348/78 |
| 2007/0201726 | A1* | 8/2007 | Steinberg | H04N 5/23222 |
| | | | | 382/103 |
| 2012/0082384 | A1* | 4/2012 | Kaneda | G06K 9/00308 |
| | | | | 382/195 |
| 2015/0110349 | A1* | 4/2015 | Feng | G06K 9/00234 |
| | | | | 382/103 |
| 2017/0147905 | A1 | 5/2017 | Huang et al. | |

OTHER PUBLICATIONS

The State Intellectual Property Office of the People's Republic of China (SIPO) Office Action 1 for 201710625671.0 dated Mar. 1, 2019 8 Pages (including translation).

* cited by examiner

METHOD AND APPARATUS FOR OCCLUSION DETECTION ON TARGET OBJECT, ELECTRONIC DEVICE, AND STORAGE MEDIUM

CROSS-REFERENCES TO RELATED APPLICATIONS

This application is a continuation application of PCT Patent Application No. PCT/CN2018/090994, filed on Jun. 13, 2018, claims priority to Chinese Patent Application No. 201710625671.0, entitled "METHOD AND APPARATUS FOR OCCLUSION DETECTION ON TARGET OBJECT, ELECTRONIC DEVICE, AND STORAGE MEDIUM" filed with the Chinese Patent Office on Jul. 27, 2017, the entire contents of both of which are incorporated herein by reference.

FIELD OF TECHNOLOGY

The present disclosure relates to the field of information technologies, and in particular, to occlusion detection.

BACKGROUND OF THE DISCLOSURE

In some cases, an electronic device needs to obtain some images including a target object. However, sometimes, the target object is obstructed, occluded, or cluttered in a captured image or an image uploaded by a user. Consequently, the captured or loaded image does not satisfy a requirement.

In the existing technology, an approach of detecting such an occlusion may usually be manual screening. Another approach is repeatedly performing detection, extraction, and iteration based on image features to automatically determine whether a current target object is occluded. With regard to the former approach, it is obvious that manual operation is inefficient, and with regard to the latter approach, although automatic determining is achieved by using an electronic device, there are still problems such as a large calculation amount and low precision.

SUMMARY

In view of this, embodiments of the present disclosure provide a method for occlusion detection on a target object, an electronic device, and a storage medium, thereby resolving problems of a large calculation amount and low precision in occlusion detection.

A first aspect of embodiments of the present disclosure provides a method for occlusion detection on a target object. The method includes: determining, by an electronic device based on a pixel value of each pixel in a target image, first positions of a first feature and second positions of a second feature in the target image. The first feature is an outer contour feature of a target object in the target image, the second feature is a feature of an interfering subobject in the target object. The method also includes: determining, based on the first positions, an image region including the target object; dividing, based on the second positions, the image region into at least two detection regions; and determining, by the electronic device according to a pixel value of a target detection region, whether the target detection region meets a preset unoccluded condition. The target detection region is any one of the at least two detection regions. The method also includes: determining, by the electronic device, that the target object is occluded when the preset unoccluded condition corresponding to any one of the at least two detection regions is not met; and determining, by the electronic device, that the target object is not occluded when determining that the preset unoccluded condition corresponding to each of the at least two detection regions is met.

A second aspect of the embodiments of the present disclosure provides an apparatus for occlusion detection on a target object, including: a memory and a processor coupled to the memory. The processor is configured to determine, based on a pixel value of each pixel in a target image. The first feature is an outer contour feature of a target object in the target image, the second feature is a feature of an interfering subobject in the target object. The processor is also configured to: determine, based on the first positions, an image region including the target object; divide, based on the second positions, the image region into at least two detection regions; and determine, by the electronic device according to a pixel value of a target detection region, whether the target detection region meets a preset unoccluded condition. The target detection region is any one of the at least two detection regions. The processor is also configured to: determine that the target object is occluded when the preset unoccluded condition corresponding to any one of the at least two detection regions is not met; and determine that the target object is not occluded when determining that the preset unoccluded condition corresponding to each of the at least two detection regions is met.

A third aspect of the embodiments of the present disclosure provides a non-transitory computer storage medium, storing a computer program. The computer program can, when being executed by a processor, cause the processor to perform: determining, based on a pixel value of each pixel in a target image. The first feature is an outer contour feature of a target object in the target image, the second feature is a feature of an interfering subobject in the target object. The computer program also causes the processor to: determine, based on the first positions, an image region including the target object; divide, based on the second positions, the image region into at least two detection regions; and determine, by the electronic device according to a pixel value of a target detection region, whether the target detection region meets a preset unoccluded condition. The target detection region is any one of the at least two detection regions. The computer program also causes the processor to: determine that the target object is occluded when the preset unoccluded condition corresponding to any one of the at least two detection regions is not met; and determine that the target object is not occluded when determining that the preset unoccluded condition corresponding to each of the at least two detection regions is met.

In the method for occlusion detection on a target object, the electronic device, and the storage medium provided by the embodiments of the present disclosure, according to a first aspect, before occlusion detection is performed, an image region including an entire target object is determined by extracting feature points of the target object, for example, extracting a first feature from a target image. A non-target object is excluded from interfering with detection on whether there is an occlusion in the target object. According to a second aspect, second positions of a feature of an interfering subobject that is included by the target object and that interferes with occlusion detection are extracted, then the entire image region is divided based on the second positions to obtain respective detection regions, and subsequently, whether there is interference in each detection region is determined individually. In this way, interference from the target object itself on occlusion detection can be reduced or excluded, thereby improving precision of occlusion detection in two aspects of excluding interference from the non target object and excluding interference from the interfering subobject of the target object. According to a third aspect, there is no repeated iterative calculation process in a detection process, thereby reducing problems of a large calculation amount and complex calculations caused by iterative calculations, improving a detection effect of occlusion detection, and reducing resource overheads of occlusion detection.

DESCRIPTION OF EMBODIMENTS

The following further describes the technical solutions of the present disclosure in detail with reference to the accompanying drawings of the specification and specific embodiments.

Figure 1:
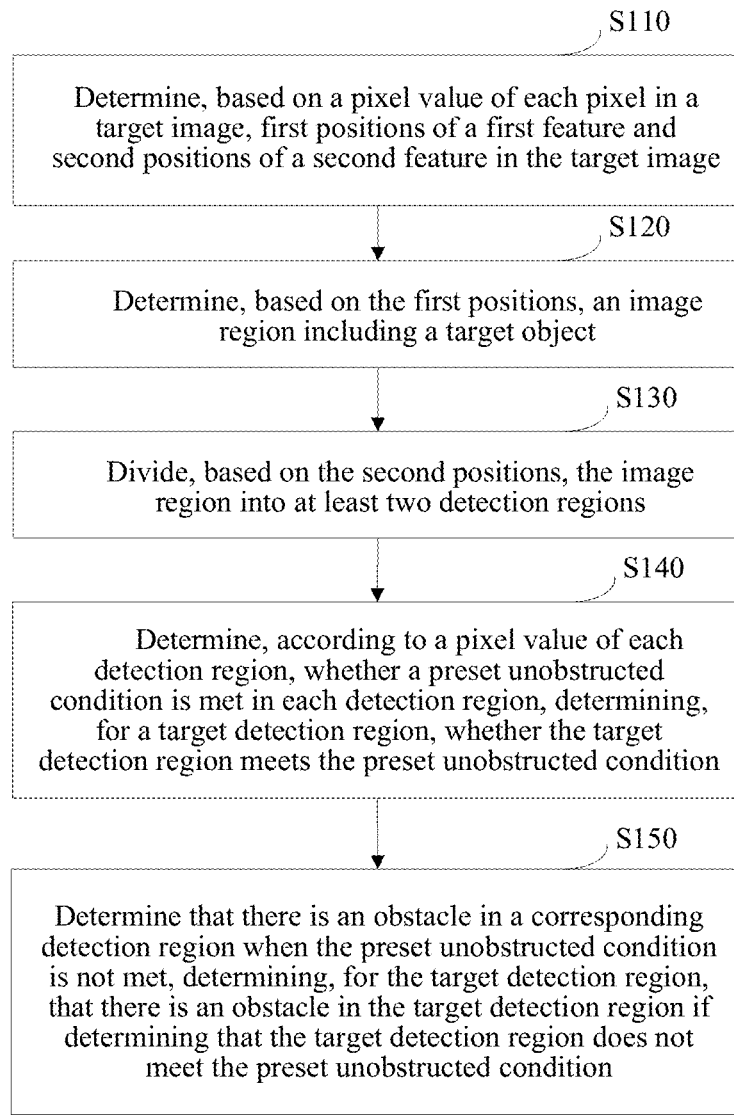
FIG. 1 is a schematic flowchart of a method for occlusion detection on a target object according to an embodiment of the present disclosure.
Figure 2:
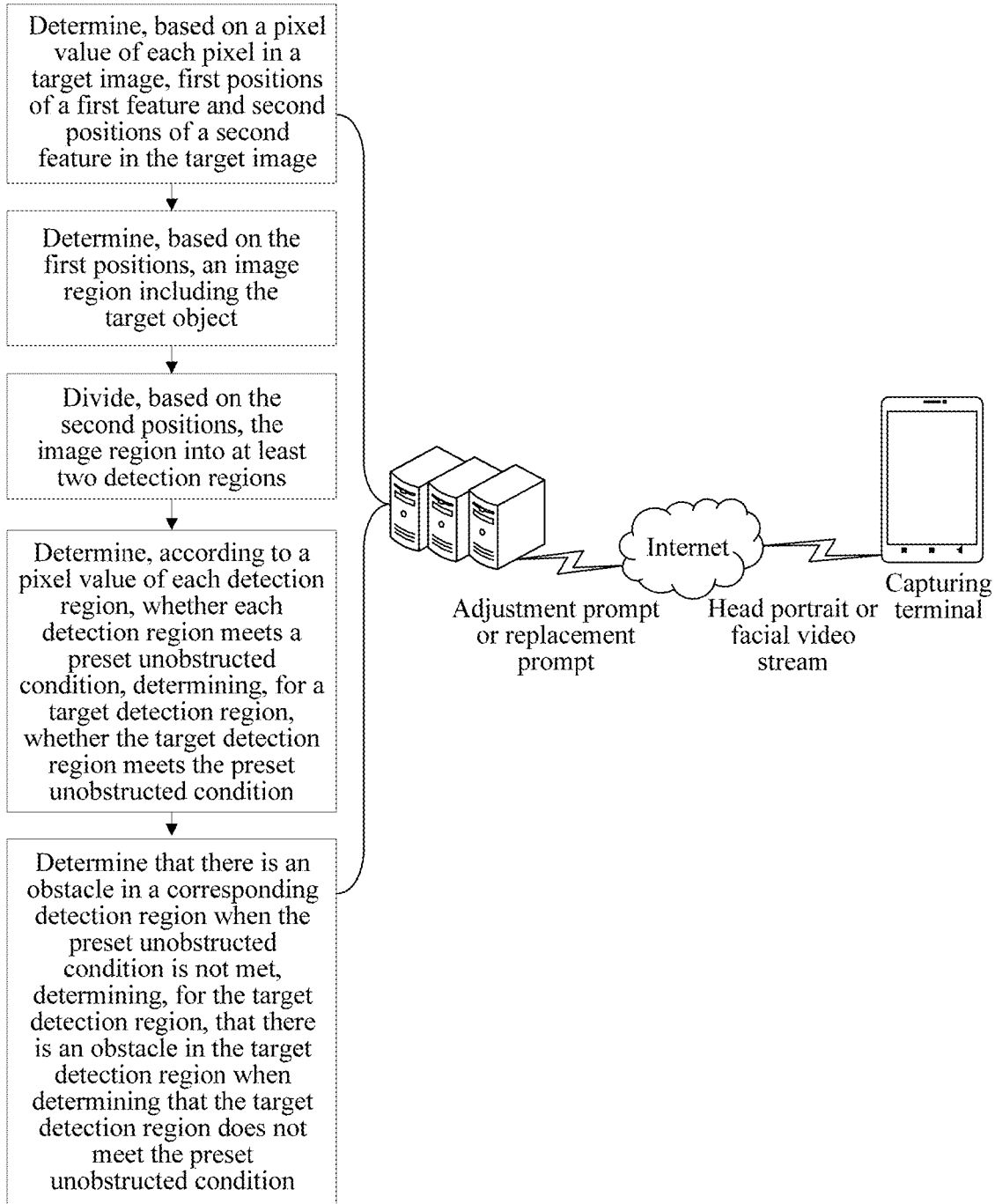
FIG. 2 is a schematic flowchart of a method for occlusion detection on a target object according to an embodiment of the present disclosure.

As shown in FIG. 1 and FIG. 2, some embodiments provide a method for occlusion detection on a target object, including:

Occlusion detection, or obstruction detection, as used herein, may refer to detecting any undesired effects on the image of the target object caused by environment or other objects. For example, the target object may be covered/cluttered by another object or interfered by variant illumination (e.g., stronger lighting at one area of the target object and darker lighting at another area of the target object).

S110: Determine, based on a pixel value of each pixel in a target image, first positions of a first feature and second positions of a second feature in the target image, the first feature being an outer contour feature of a target object in the target image, the second feature being a feature of an interfering subobject in the target object, and the interfering subobject being a subobject that interferes with occlusion detection and that is in the target object.

S120: Determine, based on the first positions, an image region including the target object.

S130: Divide, based on the second positions, the image region into at least two detection regions.

S140: Determine, according to a pixel value of each detection region, whether a preset unocluded (or unobstructed) condition is met in each detection region, determining, for a target detection region, whether the target detection region meets the preset unoccluded condition according to a pixel value of the target detection region, and the target detection region being any one of the at least two detection regions.

S150: Determine that there is an occlusion in a corresponding detection region when the preset unoccluded condition is not met, determining, for the target detection region, that there is an occlusion in the target detection region if determining that the target detection region does not meet the preset unoccluded condition.

The method for occlusion detection on a target object provided by some embodiments may be applied to various electronic devices, and usually, may be applied to a server on a network side, or may be applied to a terminal device providing the target image. The server may be an image server uploading an image. The terminal device may be various mobile terminals or fixed terminals such as a mobile phone, a tablet computer, a wearable device, a notebook computer, or a desktop computer. FIG. 2 shows that a target image is captured by a capturing terminal, the capturing terminal sends the target image to a server through the Internet or the like, and after receiving the target image, the server performs the step S110 to step S150. An execution body shown in FIG. 2 is the server. In some embodiments, the execution body may alternatively be the capturing terminal itself. The capturing terminal therein may be any electronic device with a camera such as a mobile phone or a tablet computer.

In some embodiments, the step S110 may include: inputting the target image into a learning model by using a machine learning algorithm or the like, automatically performing, by the learning model, information processing on the target image, and extracting an image region including the target object from the target image, where the target object may be described by feature points of the target object. A feature point of the target object may be referred to as a target feature. The target features herein include: the first feature and the second feature. Usually, in this case, the image region is a large image region that is open. For example, the target object is a face. The first feature may be an outer contour feature indicating a shape of the face. The second feature is a feature of a pre-specified organ in the face. The pre-specified organ may include at least an organ such as eyebrows, eyes, nose, lips or forehead. The pre-specified organ herein is a specific example of the foregoing interfering subobject. In conclusion, the second feature is a feature of an interfering subobject.

Figure 3:
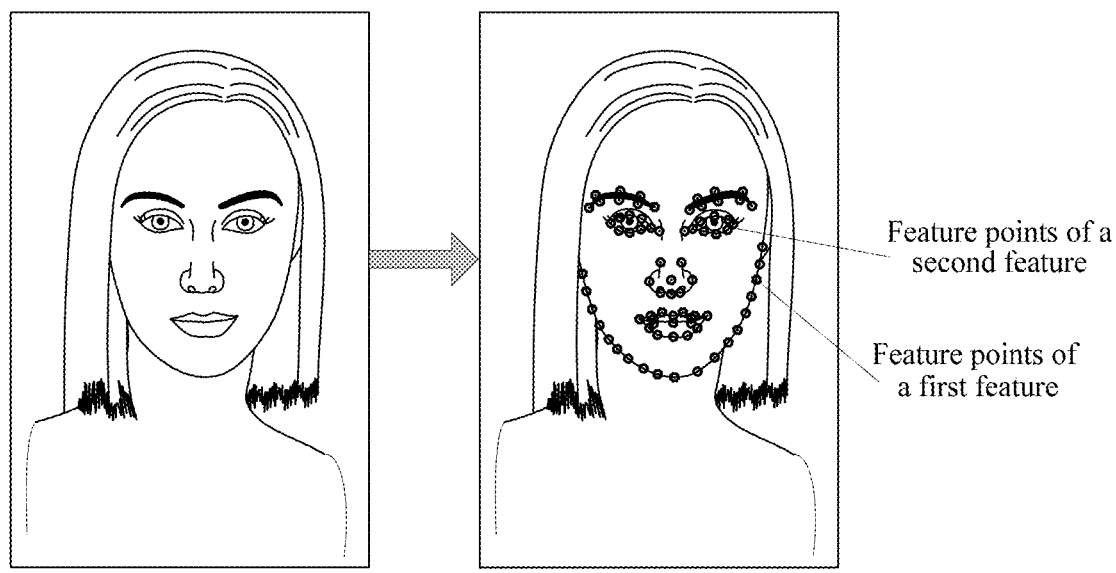
FIG. 3 is a schematic diagram of displaying changes of a target image and a feature tag according to an embodiment of the present disclosure.

A left-side image in FIG. 3 is a target image, and a right-side image in FIG. 3 is an image in which feature points corresponding to the first feature and the second feature are marked. When the target object is a face, the first feature is a facial outer contour feature. The second feature is features of eyes, eyebrows, nose, and mouth.

In some embodiments, the learning model may be a neural network, a support vector machine, a cascade regression model, or the like obtained by training by using a training sample marked with a recognition result. For example, the learning model is obtained by using a random forest.

First, in an offline training stage, a large quantity of training samples marked with the target object are collected, and may, for example, be samples in which positions of the first feature and the second feature of the target object are manually marked. The random forest is a classifier for training and predicating samples by using a plurality of decision trees.

Then, a random forest of a target feature is established according to a local binary pattern (LBP) of feature points of each feature, and machine learning is performed the random forest, to obtain parameter values of all nodes of the random forest. Once a parameter value is determined, it is equivalent to that a learning model is determined. The LBP is an operator used to describe a local texture feature of an image, and has notable advantages such as rotation invariance and gray level invariance. If the LBP operator is defined to fall within a 3*3 window, a central pixel value of the window is a threshold, and gray level values of eight neighboring pixels are compared with the central pixel value. If a neighboring pixel value is greater than the central pixel value, a position of the pixel is marked with 1; otherwise, it is marked with 0. The window herein includes 3*3=9 pixels. In some embodiment, a size of the window may alternatively be adjusted according to needs. For example, the window is adjusted into a 4*4 window.

In an online recognition stage: a target image, such as a to-be-recognized facial image, is processed by using the trained learning model, a LBP feature of the target feature is calculated, and then, the feature is determined by using the random forest trained before, to obtain final positions such as geometric positions of the target feature in the image or pixel coordinates of pixels corresponding to the target feature. In some embodiments, the first feature and the second feature are extracted by using an Active Shape Model (ASM) based on shape constraints on the target object or by using Active Appearance Model (AAM) based on shape constraints and texture constraints on the target object, thereby determining the first positions and the second positions.

For example, the first positions and the second positions may both be pixel coordinates or geometric positions of corresponding pixels of the corresponding target feature in the target image.

In some embodiments, Scale-invariant feature transform (SIFT) may alternatively be used to extract the first positions corresponding to the first feature and the second positions corresponding to the second feature.

After the first positions are extracted, a position of the target object in the target image may be determined based on the first positions, thereby determining an image region corresponding to the target object.

After the second positions are extracted, the image region may be divided into at least two detection regions based on the second positions. During specific implementation, the image region is divided into several sub-regions based on the second positions, and each sub-region is referred to as a detection region.

For example, in some embodiments, each sub-region includes the interfering subobject. That is, each detection region may include the interfering subobject. In some other embodiments, each interfering subobject may be directly taken off. In this way, none of the detection regions includes the interfering subobject.

Optionally, the step S120 may include:
connecting first positions of the first feature in series to obtain a closed image region.

Correspondingly, the step S130 may include:
connecting the second positions (e.g., multiple pixels at the second positions) in series, to obtain a dividing line for dividing the image region, so that the dividing line and an edge line of the image region can be combined into at least two closed detection regions not including the interfering subobject.

Figure 4:
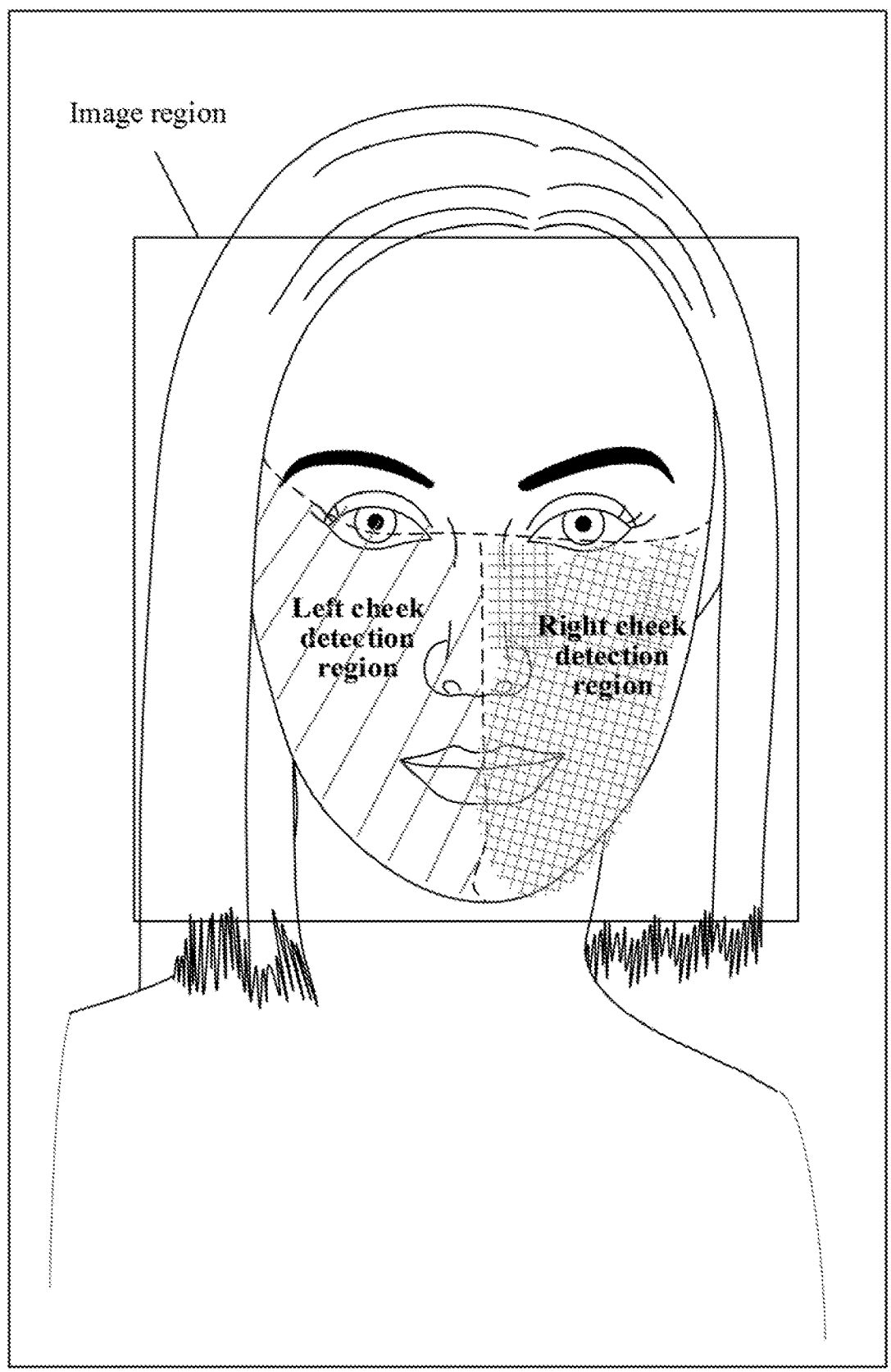
FIG. 4 is a schematic diagram of a type of detection region division according to an embodiment of the present disclosure.

FIG. 4 shows that: when the target object is a face, and the interfering subobject is an organ of the face, an image region including the face is divided into detection regions based on distribution of organs. The detection region shown in FIG. 4 includes an image part of an organ such as eyebrows or lips.

Figure 5A:
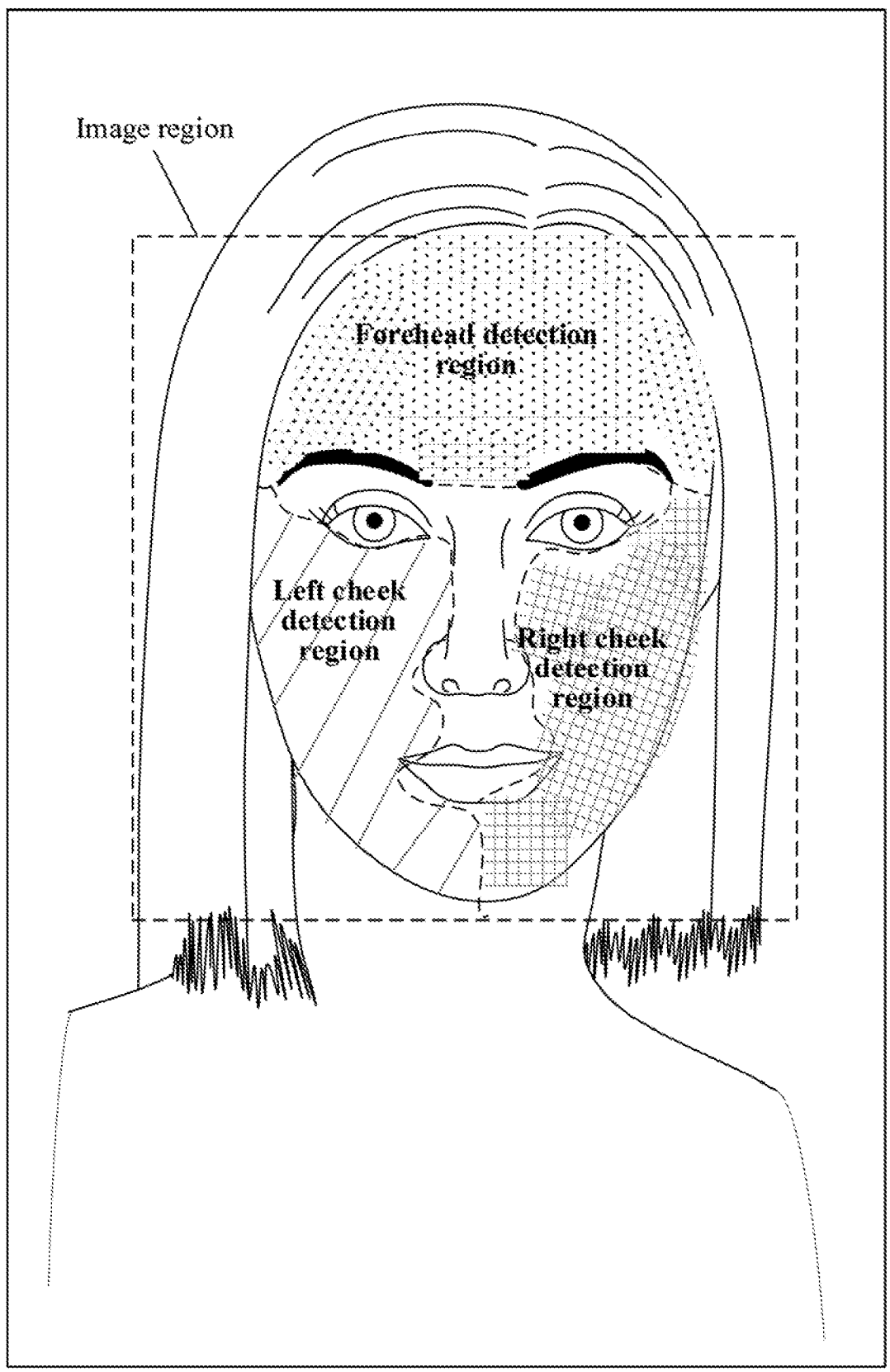
FIG. 5A is a schematic diagram of another type of detection region division according to an embodiment of the present disclosure.
Figure 5B:
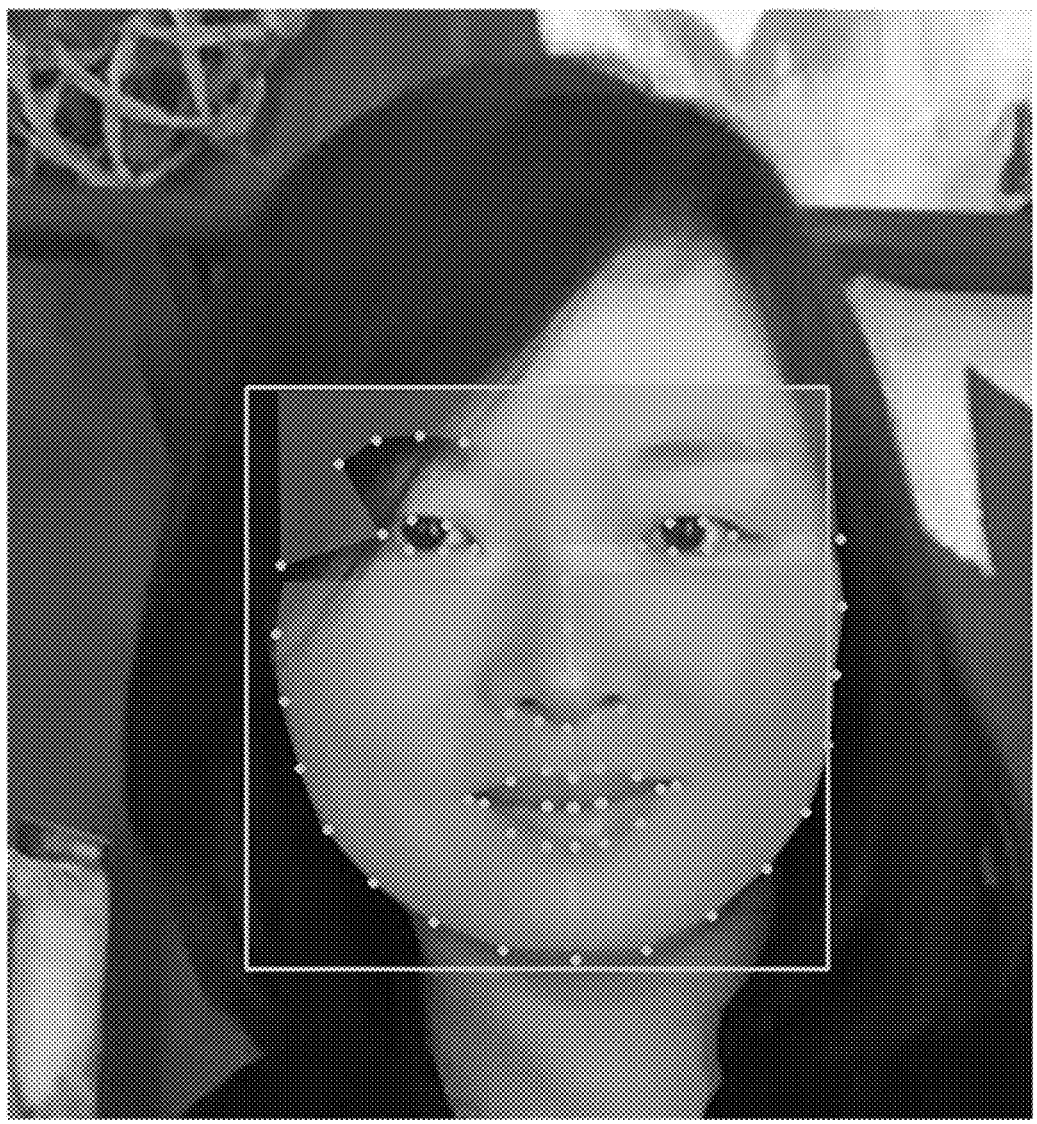
FIG. 5B is a schematic diagram of another type of detection region division according to an embodiment of the present disclosure.

FIG. 5A and FIG. 5B show that: when the target object is a face, and the interfering subobject is an organ of the face, a detection region not including an interfering subobject is formed after the interfering subobject is directly taken off.

Dashed line blocks in FIG. 4, FIG. 5A and FIG. 5B represent a corresponding image region when the face is used as the target object. In the image shown in FIG. 4, the image region corresponding to the face is divided into two regions: a left cheek detection region (line-shading area) and a right cheek detection region (meshed area). In other words, the left cheek detection region and the right cheek detection can be extracted from the image region based on the identified feature points. In some other embodiments, the image region may be divided into a left face region and a right face region.

In the image shown in FIG. 5A, the image region corresponding to the face (e.g., a region formed by the contour line of the face) is divided into three regions: a forehead detection region (dotted area) including forehead, a left cheek detection region (line-shading area) including left cheek, and a right cheek detection region (meshed area) including right cheek. Similarly, in the image shown in FIG. 5B, in a practical example three regions (forehead detection region, left cheek detection region, and right cheek detection region) are identified based on the feature points shown, excluding interfering subobjects such as eyes, nose and lips.

The detection regions can be formed by connecting some pixels of the second positions (and sometimes with some pixels of the first positions). For example, the left cheek detection region can be formed by sequentially connecting feature points representing lower edges of the left eye, feature points representing left side of the nose, and feature points representing left side of the lips to form a connected countour line Further, the connected contour line obtained from the second positions may be connected with contour points of the target object (e.g., feature points at first positions representing left side face contour) or contour points of the target image (e.g., left and bottom edge of the image) to form a closed region.

Each detection region is a sub-region of the image region including the target object.

In conclusion, there are many manners of dividing the image region into at least two detection regions. This is not limited to any foregoing one.

In step S140, for a target detection region, whether the target detection region meets occluded the preset unoccluded condition is determined according to a pixel value of the target detection region. In some embodiments, the pixel value may be a color value, such as a red, green, blue (R, G, B) value, of a pixel included in the target detection region.

During implementation, the pixel value of the target detection region may be all pixel values or some pixel values in the target detection region.

In addition to the face, the target object may be a half human body or a full human body. Therefore, the target image may be a facial image, a half-length portrait, or a full-length portrait.

In some embodiments, the target image may alternatively be an image including another target object. For example, a surveillance image includes an imaged image of a vehicle.

In some embodiments, the interfering subobject may be an image part that interferes with detecting whether the target object is occluded by an occlusion. In some embodiments, the detection region is obtained by determining the second positions and dividing the image region. Image processing is performed based on the detection region, to determine whether there is an occlusion in the detection region, and compared with performing processing through repeated iterations in the existing technology, has features of a small calculation amount and a high processing speed. In addition, interference of the target object itself on detecting whether there is an occlusion is excluded by processing the second positions corresponding to the interfering subobject, so that determining precision is improved.

In some embodiments, if whether the target object is occluded is determined based on the color feature, the interfering subobject that is in the target object and that interferes with occlusion determining is an image element having a color similarity with an occlusion. For example, when the target object is a face, features of five organs are obviously different from a feature of skin, and an occlusion is usually different from the feature of skin. In this case, with respect to skin, five organs are interfering subobjects having a color similarity with the occlusion. Five organs of a human herein may include: eyebrows, eyes, mouth, nose, and ears.

In some other embodiments, if whether the target object is occluded is determined based on the shape feature, the interfering subobject that is in the target object and that interferes with occlusion determining is an image element having a shape similarity with an occlusion. For example, the target object is a human body, and a pattern on a cloth of a photographed person may be an interfering subobject having a shape similarity with an occlusion. For example, if a photographed person A wears a coat having a model of an airplane pattern. How to specifically determine whether the airplane pattern is a pattern on the cloth or an occlusion pattern outside the cloth is not determined. Therefore, in this case, an impact of a pattern on a cloth needs to be eliminated. The impact on determining whether there is an occlusion is eliminated, to obtain a more precise result.

Optionally, the method further includes:

obtaining attribute information of the target object, where the attribute information includes overall attribute information and/or regional attribute information, the overall attribute information is used to represent an overall attribute of the target object, and the regional attribute information is used to represent a regional attribute of the detection region;

determining, according to the attribute information, a determining basis parameter and/or a determining policy, where the determining, for a target detection region, whether the target detection region meets the preset unoccluded condition according to a pixel value of the target detection region includes at least one of the following:

determining, according to the determining basis parameter and the pixel value of the target detection region, whether the target detection region meets the preset unoccluded condition; and determining, based on the pixel value of the target detection region, whether the target detection region meets the preset unoccluded condition by using the determining policy.

The overall attribute information may include type information of the target object, for example, whether the target object is a face, a full body, or a half body, an animal image, a vehicle image, or the like.

For using an overall or partial human body as a target object using, the overall attribute information may include gender information, age information, or the like. For example, males are different from females in terms of a proportion of an area of five organs to an area of face. For example, eyes of a female are relatively large, and eyes of a male are relatively small. For example, adults are also different from children in terms of the proportion. For example, an adult male may have a large area of skin on the forehead part because of a reason such as baldness, and a child may have a feature of extremely small forehead because of thick hair and a low hairline. Therefore, in some embodiments, a determining basis parameter and/or a determining policy is determined according to the overall attribute information.

The regional attribute information reflects a feature of a corresponding detection region. For example, different detection regions include different interfering subobject s, and the interfering subobjects interfere with occlusion detection in different ways. For example, the regional attribute information herein may be a parameter such as a type of the interfering subobject.

In some embodiments, if the target object is a face and eyes and eyebrows are both classified into a forehead detection region corresponding to forehead, while nose and mouth are divided half-and-half into a left cheek detection region and a right cheek detection region. In some embodiments, different ratios of an area of skin to an area of the entire region need to be distinguished. Therefore, during determining, determining may be performed based on different area thresholds.

Different target objects may correspond to different determining policies, for example, determining is performed based on a color or based on a shape.

In conclusion, in some embodiments, first, a determining basis parameter and/or a determining policy is determined based on at least one of overall attribute information and regional attribute information. In this way, whether there is an occlusion in each detection region can be precisely determined by using the corresponding determining basis parameter and/or determining policy.

In some embodiments, the determining basis parameter includes at least: an extreme value used to determine whether a specific detection region is occluded or an interval value used to determine whether a specific detection region is occluded.

Certainly, the above are merely examples, and during specific implementation, it is not limited to any one of the foregoing values.

Optionally, the step S140 may include:

determining a detection ratio of a quantity of pixels that are in the target detection region and that have pixel values in a same range to a total quantity of all pixels in the target detection region;

comparing the detection ratio with a preset ratio of the target detection region; and determining that there is an occlusion in the target detection region if the detection ratio is less than the preset ratio.

For example, the pixel value may be a color value, such as an RGB value, a quantity of pixels located in a same range is determined, and being in a same range herein may indicate that: all pixels whose differences therebetween fall within a preset difference range may be pixels in a same range. A ratio of quantity of the quantity of pixels to a total quantity of all pixels in the target detection region is obtained. The ratio of quantity herein may be the detection ratio. The preset ratio may be a predetermined empirical value or simulation value.

Therefore, in some embodiments, the detection ratio in each detection region is computed, and then, the detection ratio of the detection region is compared with a corresponding preset ratio, to determine whether the detection region is occluded.

In some embodiments, whether there is an occlusion in the detection region can be easily calculated by simply computing a pixel value of each detection region and a ratio. Compared with performing repeated iterations and calculations on a large quantity of pixels, some embodiments has features of a small calculation amount, a small quantity of consumed calculation resources, and a high determining speed.

Optionally, different detection regions correspond to different preset ratios.

In some embodiments, alternatively, according to a feature of each detection region, a preset ratio capable of reflecting an original feature of the detection region is provided. In this way, during determining of the target image, compared with using a unified preset ratio, whether there is an occlusion in each detection region can be determined more precisely, thereby further improving precision of occlusion determining.

Specifically, with regard to how to perform determining, several optional manners are provided with reference to any one of the following embodiments:

Optional manner 1:

The step S140 may specifically include:

obtaining, based on a pixel value of an edge pixel of the target detection region, a shape feature of the target detection region, and determining whether the shape feature corresponds to a preset shape.

For example, the target object is a half-length portrait of a person. If a pattern or shape on a wear, such as a cloth, of the person has a similarity with an occlusion that actually obstruct the body of the person. For example, both of the pattern or shape and the occlusion have a relatively sharp line. However, the occlusion on the cloth may be curved with the cloth, but the actual occlusion would not be curved. Therefore, in step S110, the line features are detected in a manner such as edge feature detection, and then, in step S130, whether a line feature is inside a cloth or outside a cloth or is located inside a boundary framed by a human body boundary or outside the boundary is determined based on a curvature of the line feature. In step S140, detection region division may be performed according to a curvature based on the lines, and then detection is performed, or determining may be performed based on being inside or outside of the boundary.

Optional manner 2:

The step S140 may include:

determining, based on a pixel value of each pixel in the target detection region, a color feature in the target detection region, and determining whether the color feature meets a preset color condition.

For example, based on a pixel value of each pixel of the target detection region, if it is determined that a large quantity of pixels with non-skin tone color values appear at positions where a skin tone should appear, the pixels may an occlusion, and the occlusion appears in the corresponding target detection region, and consequently, obstruct the target detection region.

Optionally, the method further includes at least one of the following:

outputting, according to an occluded detection region, an adjustment prompt corresponding to the detection region if the electronic device is in a capturing mode of capturing the target image and detects that the target object is occluded; and outputting a replacement prompt for the target image if the electronic device is in a non-capturing mode and detects that the target object is occluded.

If the electronic device is currently in a real-time obtaining state, for example, a user is using a computer to capture a passport-style picture or uploading a head portrait picture to a public service platform (for example, a household registration management platform or a public security system platform), and if the forehead of the user is occluded by hair or the user is photographed with sunglasses, obviously, pictures taken in this way do not satisfy requirements. Therefore, in some embodiments, step S110 to step S140 are performed, to determine that at least a particular detection region is occluded, and then, an adjustment prompt is output to prompt the user to move the hair or remove the sunglasses before taking another picture, thereby reducing a problem that photographing needs to be repeatedly performed after a picture upload to a corresponding system is identified as unqualified.

For example, if the electronic device is only in a uploading mode, currently, no camera is enabled to capture an image. Generally, it is necessary to determine whether an uploaded picture are qualified, and a backend server needs to be dedicated to examination, or backend personnel need to perform examination manually. Such examination requires the user to log in again, cannot perform feedback timely, and cannot notify the user timely either. However, in some embodiments, because step S110 to step S140 can be performed quickly, feedback may be made to the user timely, and the user is notified timely of a replacement prompt.

If the method for occlusion detection on a target object provided in some embodiments is applied to a network-side server, as shown in FIG. 2, the server may alternatively return an adjustment prompt or a replacement prompt to the capturing terminal.

Figure 6:
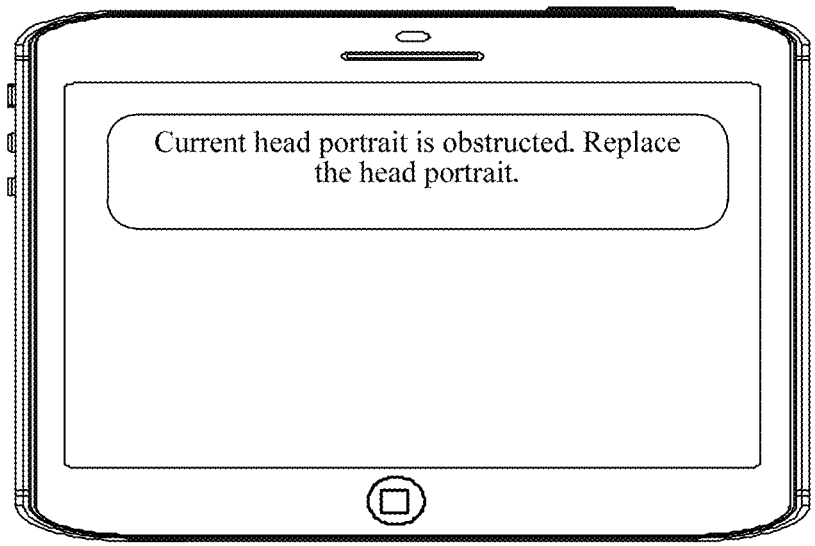
FIG. 6 is a schematic diagram of displaying a replacement prompt according to an embodiment of the present disclosure.
Figure 7:
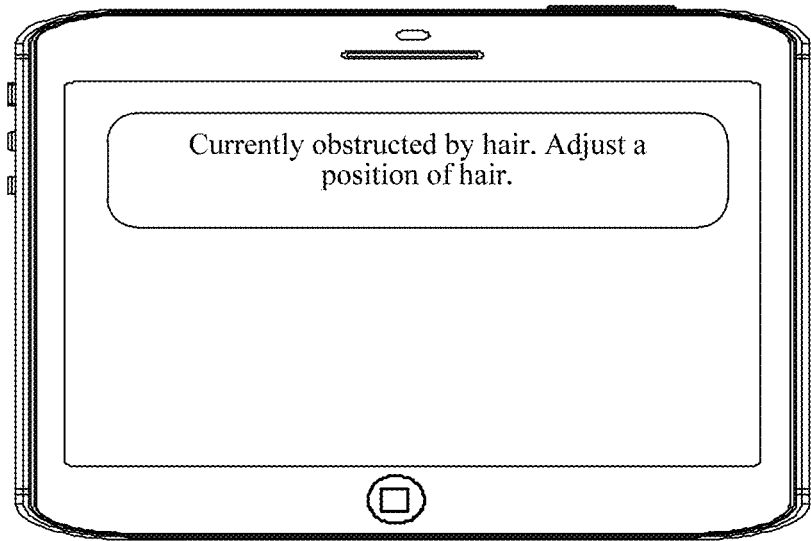
FIG. 7 is a schematic diagram of displaying an adjustment prompt according to an embodiment of the present disclosure.

FIG. 6 is a schematic diagram of displaying a replacement prompt. FIG. 7 is a schematic diagram of displaying an adjustment prompt. During specific implementation, the replacement prompt and the adjustment prompt may alternatively be output in a voice form.

In some other embodiments, the method further includes:

determining, by the electronic device according to an occluded status of the target image, whether an unoccluded replacement image can be reconstructed based on the target image if the electronic device is in an automatic reconstruction mode and detects that the target object is occluded; and generating the replacement image based on the target image if an unoccluded replacement image can be reconstructed based on the target image.

Although an image and/or a video frame uploaded by a user does not meet the unoccluded condition, and the user may be prompted to re-capture a picture or make replacement, in some embodiments, to improve intelligence of the electronic device, reconstruction is performed based on a currently captured image, and an replacement image after the reconstruction is unoccluded. For example, because a lighting problem, when the user is near a window, a strong light whitening phenomenon occurs on a side of the face as if there is an occlusion for an electronic device. If the electronic device in an automatic reconstruction mode, an image of the face on the side where strong light occurs is automatically reconstructed according to the other side of the face of the user that is not near the window and based on a symmetrical relationship of the face, so as to provide a picture that meets requirements, to prevent adjustment and capturing from being repeatedly performed by the user, thereby further improving intelligence and user satisfaction.

Optionally, the determining, according to an occluded status of the target image, whether an unoccluded replacement image can be reconstructed includes:

according to symmetry of the target object, reconstructing, if one of two symmetrical detection regions is occluded, the target image based on an unoccluded detection region symmetrical to the occluded detection region, to generate the replacement image.

During automatic reconstruction, not all target images can be reconstructed, and merely some occluded images can be reconstructed. For example, the target object is a face. The face is symmetrical, and reconstruction can be performed when only one part of any two symmetrical parts is occluded. Otherwise, it is impossible to precisely perform reconstruction. Therefore, in some embodiments, occlusion detection is performed based on each detection region, and if two detection regions are symmetrical, and one of the detection regions are occluded, reconstruction can be performed based on another detection region. For example, a face is used as an example, a left cheek region serves as a left cheek detection region, a right cheek serves right cheek detection region, and the left cheek detection region and the right cheek detection region are symmetrical to each other. If the left cheek detection region is occluded, but the right cheek detection region is unoccluded, an image of left cheek detection region can be reconstructed directly based on image data of the right cheek detection region, so as to obtain an unoccluded replacement image to replace a corresponding operation performed by the target object, for example, transmission to a peer end device.

Figure 8:
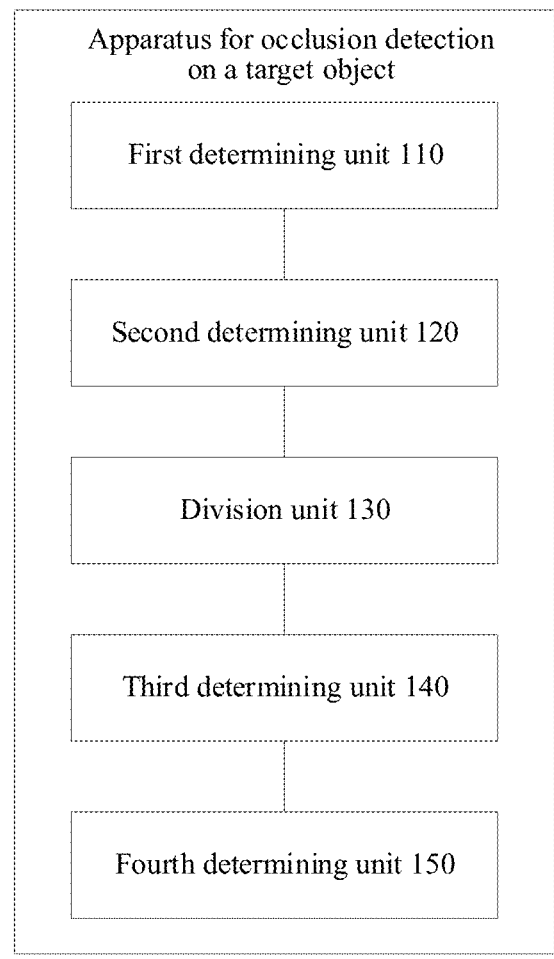
FIG. 8 is a schematic structural diagram of an apparatus for occlusion detection on a target object according to an embodiment of the present disclosure.

As shown in FIG. 8, some embodiments provide an apparatus for occlusion detection on a target object, including:

a first determining unit 110, configured to determine, based on a pixel value of each pixel in a target image, first positions of a first feature and second positions of a second feature in the target image, the first feature being an outer contour feature of a target object in the target image, the second feature being a feature of an interfering subobject in the target object, and the interfering subobject being a subobject that interferes with occlusion detection and that is in the target object;

a second determining unit 120, configured to determine, based on the first positions, an image region including the target object;

a division unit 130, configured to divide, based on the second positions, the image region into at least two detection regions; and a third determining unit 140, configured to determine, according to at least some pixel values of each detection region, whether the preset unoccluded condition is met in each detection region, the third determining unit being configured to determine, for a target detection region, whether the target detection region meets the preset unoccluded condition according to a pixel value of the target detection region, and the target detection region being any one of the at least two detection regions; and a fourth determining unit 150, configured to determine that there is an occlusion in a corresponding detection region when the preset unoccluded condition is not met, the fourth determining unit being configured to determine, for the target detection region, that there is an occlusion in the target detection region if it is determined that the target detection region does not meet the preset unoccluded condition.

The first determining unit 110, the second determining unit 120, the division unit 130, the third determining unit 140, and the fourth determining unit 150 provided by some embodiments all correspond to a processor or processing circuit. The processor may include a central processing unit (CPU), a micro-controller unit (MCU), a digital signal processor (DSP), an application processor (AP), or a programmable logic controller (PLC). The processing circuit may be an application-specific integrated circuit (ASIC) or the like. The processor or processing circuit may be configured to execute computer-executable code, such as a computer program, to implement a function of each unit.

In some embodiments, the apparatus for occlusion detection on a target object may be applied to a network-side server or be applied to a terminal capturing the target image. The server may be a cloud server or the like in various cloud platforms. The terminal may include a mobile terminal or a fixed terminal. A typical mobile terminal may include: a mobile phone, a tablet computer, a wearable device, or a portable terminal device such as a notebook computer. The fixed terminal may include a terminal device such as a desktop computer.

The apparatus for occlusion detection on a target object provided by some embodiments can first determine, extraction of position information of feature points of a target object, an image region including the target object, then, perform detection region division based on position information of an interfering subobject that is likely to interfere with occlusion detection in the target object, and then, determine an occluded status in each detection region one by one, and compared with repeated iterative determining, has features such as a small calculation amount and low calculation complexity, And has a feature of high detection precision because of region division for detection.

Optionally, the division unit 130 is configured to connect the second positions in series, to form at least two detection regions that are closed and do not include the interfering subobject.

In some embodiments, for further precise determining, a partial image corresponding to the interfering subobject may be taken off frame the detection region. In this way, each detection region is prevented from interference of an interfering subobject of the target object on occlusion detection, so that determining precision may be further improved.

Optionally, the apparatus further includes:

an obtaining unit, configured to obtain attribute information of the target object, where the attribute information includes overall attribute information and/or regional attribute information, the overall attribute information is used to represent an overall attribute of the target object, and the regional attribute information is used to represent a regional attribute of the detection region;

the fourth determining unit is configured to determine, according to the attribute information, a determining basis parameter and/or a determining policy, and the third determining unit 140 is specifically configured to perform one of the following:

determining, according to the determining basis parameter and the pixel value of the target detection region, whether the target detection region meets the preset unoccluded condition; and determining, based on the pixel value of the target detection region, whether the target detection region meets the preset unoccluded condition by using the determining policy.

In some embodiments, the apparatus further includes: the obtaining unit and the fourth determining unit. The obtaining unit and the fourth determining unit both correspond to a processor or a processing circuit. Refer to the foregoing corresponding part for detailed description on the processor or processing circuit. Details are not described herein again.

In some embodiments, by obtaining overall attribute information and/or regional attribute information, the obtaining unit obtains, according to a correspondence between attribute information and a determining basis parameter and a determining policy, a determining basis parameter and/or a determining policy suitable for the target detection region. In some embodiments, alternatively, the attribute information may be input to a special model, a determining basis parameter and/or a determining policy matching the overall attribute information is output by the special model.

Optionally, the determining unit 140 is further configured to: determine a detection ratio of a quantity of pixels that are in the target detection region and that have pixel values in a same range to a total quantity of all pixels in the target detection region; compare the detection ratio with a preset ratio of the target detection region; and determine that there is an occlusion in the target detection region if the detection ratio is less than the preset ratio. Different detection region may correspond to a same preset ratio. In some embodiments, preferably, different detection regions correspond to different preset ratios, to set preset ratios specifically according to different features of different detection regions. The preset ratio herein may be an empirical value and/or a simulation value, thereby improving determining precision of a single detection region and improving determining precision of an entire image region.

Optionally, the third determining unit 140 may be specifically configured to perform at least one of the following: obtaining, based on a pixel value of an edge pixel of the target detection region, a shape feature of the target detection region, and determining whether the shape feature corresponds to a preset shape; and determining, based on a pixel value of each pixel in the target detection region, a color feature in the target detection region, and determining whether the color feature meets a preset color condition.

Further, the apparatus further includes:

an output unit, at least configured to perform at least one of the following:

outputting, according to an occluded detection region, an adjustment prompt corresponding to the detection region if the electronic device is in a capturing mode of capturing the target image and detects that the target object is occluded; and outputting a replacement prompt for the target image if the electronic device is in a non-capturing mode and detects that the target object is occluded.

The output unit may correspond to a display output unit such as a display, and is configured to display and output the adjustment prompt and/or replacement prompt. In some embodiments, the output unit may include a voice output unit such as speaker. The voice output unit may be configured to output the foregoing adjustment prompt and/or replacement prompt in a voice form.

Optionally, the apparatus further includes:

a construction unit, configured to determine, according to an occluded status of the target image, whether an unoccluded replacement image can be reconstructed based on the target image if the electronic device is in an automatic reconstruction mode and detects that the target object is occluded; and generate the replacement image based on the target image if an unoccluded replacement image can be reconstructed based on the target image.

In some embodiments, the reconstruction unit may also correspond to a processor or a processing circuit, may be configured to reconstruct the target image based on attributes, such as symmetry, of the target object to generate a replacement image capable of replacing an original target image, thereby reducing repeated capturing, repeated prompting, or the like.

Optionally, the reconstruction unit is specifically configured to: according to symmetry of the target object, reconstruct, if one of two symmetrical detection regions is occluded, the target image based on an unoccluded detection region symmetrical to the occluded detection region, to generate the replacement image.

In some embodiments, the target object is a face. The target feature includes: features of five organs of the face. Five organs of a human herein may include: eyebrows, eyes, mouth, nose, and ears.

Figure 9:
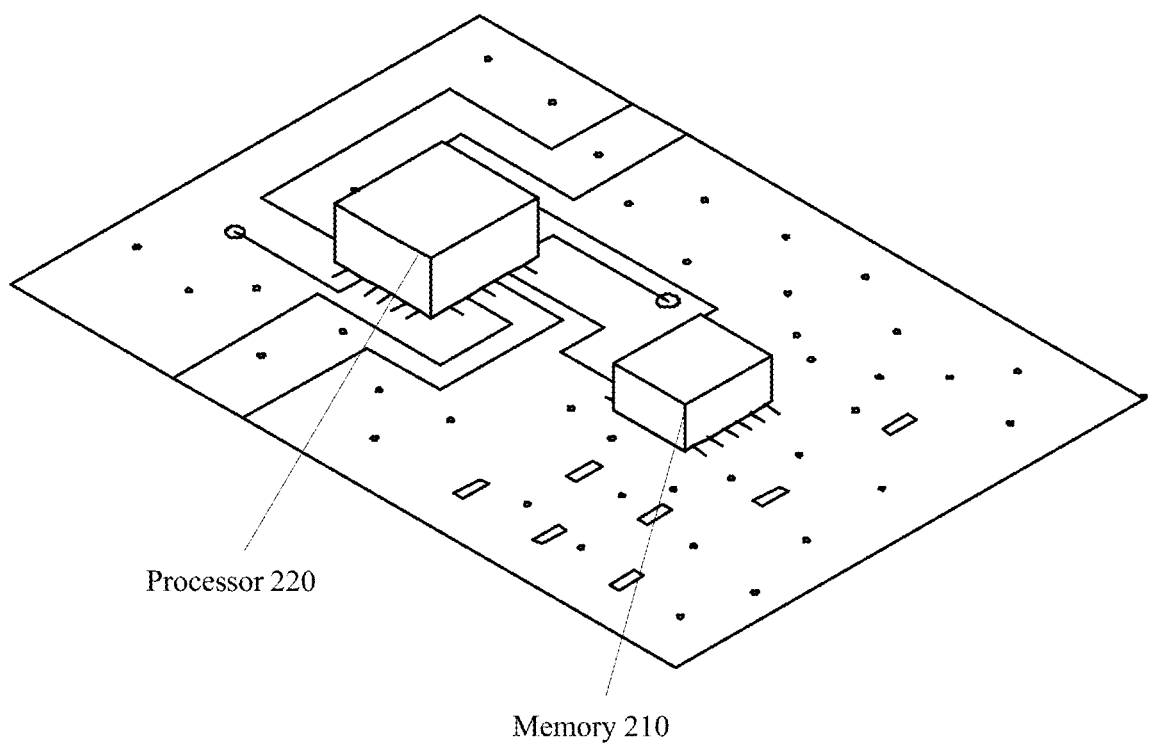
FIG. 9 is a schematic structural diagram of an electronic device according to an embodiment of the present disclosure.

As shown in FIG. 9, some embodiments provides an electronic device, including:

a memory 210, configured to store information; and a processor 220, connected to the memory and configured to execute a computer program stored in the memory, so as to perform the method for occlusion detection on a target object according to one or more technical solutions.

The memory 210 may include various storage mediums that can be configured to store a computer program. The storage medium included by the memory 210 may include: a non-transitory storage medium, and the non-transitory storage medium may be configured to store a computer program. The storage medium included by the memory 210 may further include: a storage medium, such as a cache, configured to cache a pixel value.

The processor 220 may be connected to a display screen 210 and the memory 210 through a bus 240 such as an integrated circuit IIC bus. The processor 220 may include a processor or a processing circuit such as a central processing unit, a microprocessor, a digital signal processor, an application processor, or a programmable array, and can be configured to by executing any one of the foregoing methods for occlusion detection on a target object by executing the computer program.

Some embodiments further provide a computer storage medium, the computer storage medium stores a computer program, and after the computer program is executed by a processor, the computer storage medium can perform the method for occlusion detection on a target object according to the foregoing one or more technical solutions.

In some embodiments, the computer storage medium may be various storage mediums such as a random storage medium, a read-only storage medium, a flash, a removable hard disk, a compact disc, or a magnetic tape, may selectively be a non-volatile storage medium, and may be applied to a storage medium that still stores computer program after power-down.

Several examples are provided below with reference to any one of the foregoing embodiments:

Example 1

This example provides a set of a method for automatically detecting a facial occlusion, and a method of prompting picture replacement or prompting notes for picture or video shooting when a facial occlusion is detected.

First, facial detection tagging is performed on an output picture or video stream including a face.

After an image region including the face is determined based on the facial detection tagging, a divided region for occlusion detection is selected for a face tagging result.

Skin tone detection is performed separately on detection regions, and whether the face in a corresponding detection region is occluded is automatically determined according to skin tone detection result.

In case of an occlusion, a prompt for picture replacement or head position adjustment may be provided according to a scenario.

Facial occlusion phenomena in most face scenarios can be effectively detected by using the detection method provided in this example, and a detection speed is high.

This example can be applied to scenarios, such as single-picture-based three-dimensional facial reconstruction or full-front face photographing, that needs to quickly perform automatic detection and prompt no facial occlusion.

For example, when a user takes a picture or chooses picture in an album to perform three-dimensional facial reconstruction, because a facial occlusion (such as hair or a masks) has a relatively large impact on a three-dimensional facial reconstruction effect, before the three-dimensional facial reconstruction is performed, a facial occlusion may be detected by using the method of this example. If an occlusion is detected, the user is prompted, in a manner such as a mobile phone prompt, to replace a facial picture or adjust a facial photographing position (remove the occlusion).

The method provided by this example relies on a wide hardware environment and can be used in any hardware device with image processing and image selecting capabilities such as a smartphone, a personal computer (PC), or a server.

The following specifically describes how to perform facial detection tagging.

A facial detection tagging algorithm may be used for the facial detection tagging. Common algorithms for facial detection tagging are ASM, AAM, and cascade regression.

In this example, a class, that is, a random forest manner, in the cascade regression algorithm is used. A main idea includes two stages:

a. Offline training stage: A large quantity of training samples (including facial images and feature point positions manually calibrated) for facial tagging are collected, a random forest (which is a term of a machine learning algorithm and is a cascade regressor) is established according to an image feature, that is, a LBP of each picture point, and machine learning is performed on such a random forest by using the training samples, to obtain specific parameter values of all nodes in all random forests.

b. Online recognition stage: For a facial image to be tagged, first, all LBP features of the image are calculated, then, the features are determined by using the random forests trained before, to obtain final feature points.

The following specifically describes how to divide an image region to obtain detection regions.

According to tag points of detected facial features, divided facial occlusion regions are constructed, and each skin tone area threshold is calibrated according to statistical samples.

a. Advantages of constructing divided facial occlusion regions by using tag points:

(1) Because eyebrows themselves, eyeballs, nostrils, tongue, and the like are greatly different in regions at eyebrows, inside eyeballs, at nostrils, and inside mouth, they (e.g., interfering subobjects) are likely to be incorrectly detected as non-skin tone regions. As a result, an overall occlusion detection effect is affected.

(2) It would be easier to find an occluded status of a local region by performing divided region detection: for example, only forehead is partially occluded by hair, and if an overall skin tone area proportion is calculated, a proportion of an occluded region is low, and incorrect detection is easily caused. If only a skin tone area proportion of a forehead region is calculated, a hair occlusion can be precisely detected.

Therefore, for most occluded statuses in practice, the following three occlusion detection regions are determined herein:

(1) Region of forehead-eyebrows-eye lower edges (occluded statuses caused by a fringe of hair, sunglasses, or the like).

(2) Region from a left cheek to a left nostril or a left mouth corner (occluded statuses caused by a mask, left-side long hair, or the like).

(3) Region from a right cheek to a right nostril or a right mouth corner (occluded statuses caused by a mask, right-side long hair, or the like).

b. An occlusion threshold of each region is tagged according to statistical samples.

Facial picture sampling is performed for various common occluded statuses and unoccluded statuses herein mainly according to actual sampling. For each picture, facial skin tone area proportions (a quantity of pixels detected to have a skin tone/a total quantity of pixels of a detection region) of the three regions are separately calculated, and tolerable minimum occluded skin tone area proportions of the respective detection regions are computed as skin tone occlusion thresholds of the detection regions.

The following specifically describe performing occlusion determining with reference to skin tone detection, including the following steps.

a. Traverse all pixels in each detection region and perform skin tone detection on pixel value thereof (RGB space, briefly recorded as (r, g, b) below):

(1) Calculate a skin tone determining parameter 1 (param1): param1=(−176933*r−347355*g+524288*b+134217728)>>20

(2) If param1<=77 or param1>=127, determine a color as a non-skin tone (2) If 127>param1>77, further calculate the skin tone determining parameter 2 param2:
param2=(524288*r−439026*g−85262*b+134217728)>>20

If 173>param2>133, determine the color is a skin tone; otherwise, determine the color as a non-skin tone.

Practice has proved that if parameter calculations in this algorithm are used, most lighting statuses, skin tone statuses can be correctly detected. 20, 77, 127, 133 and 170 herein are all determining thresholds, and may be one of the foregoing determining basis parameters.

b. Compute a skin tone area proportion in a region: a quantity of all skin tone pixels/a total quantity of pixels of a detection region, and compare it with an occlusion threshold computed in "b", where if the proportion is less than the occlusion threshold, it indicates that there is an occlusion in this region.

Practice has proved that this solution can effectively detect a facial occlusion status, to avoid interference of common error detection regions such as eyeballs, mouth, and nostrils. In addition, it can be learned from the algorithm of the solution that the entire technical solution has a small calculation amount and a high detection speed and is a better facial occlusion detection solution that is accurate and quick.

In some cases, an overall attribute, a regional attribute, and the like of a target object may be distinguished to set a determining basis parameter. The following describes differences of determining basis parameters by using an example in which the gender is an overall attribute.

Occlusion thresholds of three detection regions (meaning: a quantity of pixel values detected to be the skin tone/a total quantity of pixels in a detection region):

Detection region 1: corresponding to a region of forehead-eyebrows-eye lower edges. Occluded statuses caused by a fringe of hair, sunglasses, or the like are mainly detected, and occlusion thresholds may be as follows:

male: 86%-90%;
female: 82%-91%; and
neutral (applicable to an unknown gender): 86%-90%.

Detection region 2: corresponding to a region from a left cheek to a left nostril or a left mouth corner. Occluded statuses caused by a mask, left-side long hair, or the like are mainly detected, and occlusion thresholds may be as follows:

male: 88.2%-92.7%;
female: 86.4%-92.5%; and
neutral (applicable to an unknown gender): 88%-92%.

Detection region 3: corresponding to a region from a right cheek to a right nostril or a right mouth corner. Occluded statuses caused by a mask, right-side long hair, or the like are mainly detected, and occlusion thresholds may be as follows:

male: 88.2%-92.7%;
female: 86.4%-92.5%; and
neutral (applicable to an unknown gender): 88%-92%.

Example 2

Figure 10:
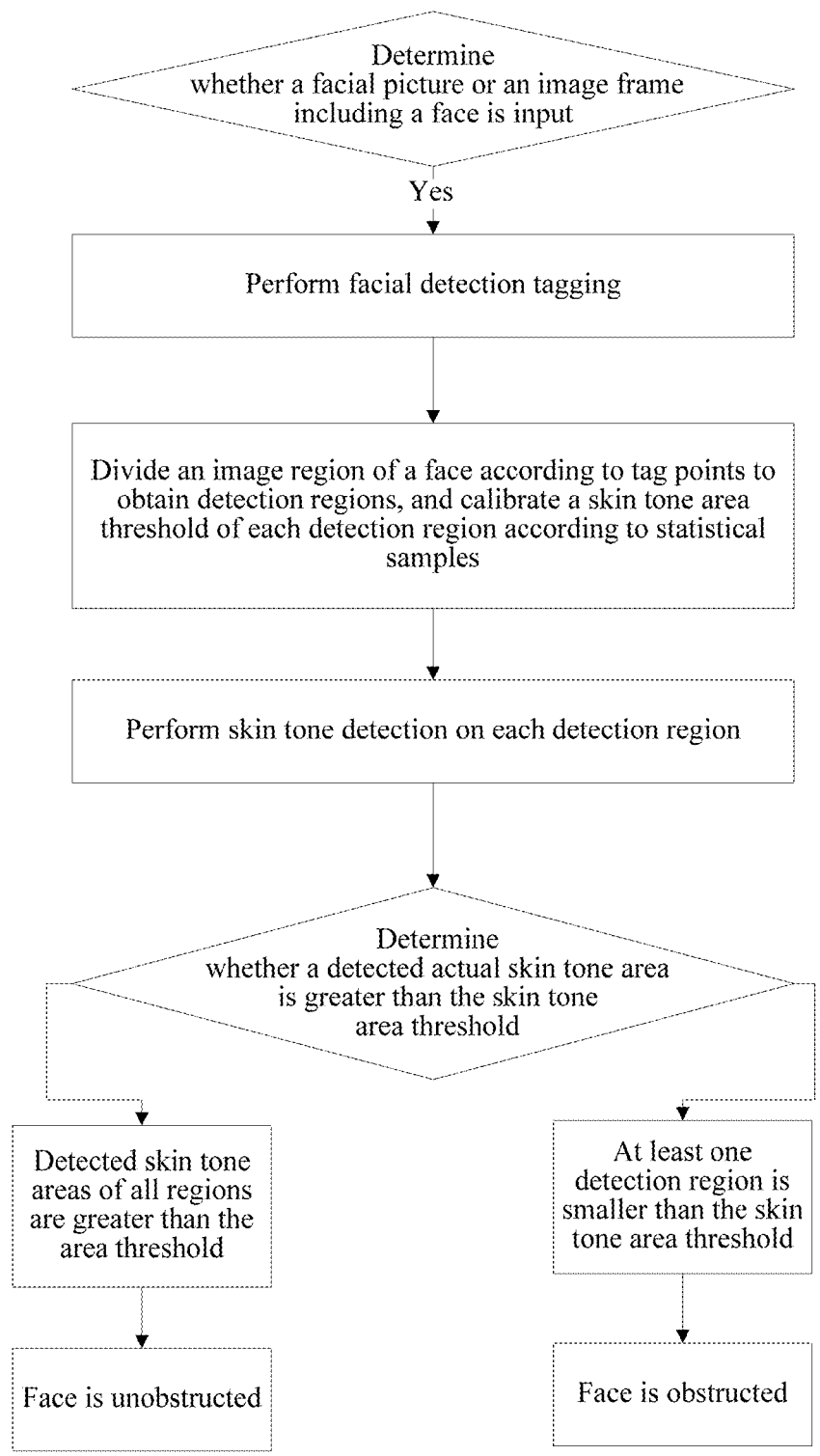
FIG. 10 is a schematic flowchart of a method for occlusion detection on a target object according to an embodiment of the present disclosure.

As shown in FIG. 10, this example provides another face occlusion detection method, including:

determining whether a facial picture or an image frame including a face is input, where the image frame may be a component of a video stream, if yes, a next step is performed; otherwise, the present step is returned to;

performing facial detection tagging, specifically including: performing feature detection on the facial picture or the image frame including a face;

dividing an image region of a face according to tag points to obtain detection regions, and calibrating a skin tone area threshold of each detection region according to statistical samples;

performing skin tone detection on each detection region;

determining whether a detected actual skin tone area is greater than the skin tone area threshold;

determining that the face is unoccluded when detected skin tone areas of all regions are greater than the area threshold; and determining that the face is occluded when a detected skin tone area of at least one detection region is smaller than the skin tone area threshold.

In the several embodiments provided in the present application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, functional units in the embodiments of the present disclosure may be all integrated into one processing module, or each of the units may be separately independently used as one unit, or two or more units may be integrated into one unit. The integrated unit may be implemented in a form of hardware, or may be implemented in a form of hardware in addition to a software functional unit.

A person skilled in the art can understand that all or some steps for implementing the foregoing method embodiment may be completed by a program instructing related hardware, the foregoing program may be stored in a computer-readable storage medium, and when being executed, the program performs steps including the foregoing method embodiment. The foregoing storage medium includes: any medium that can store program code, such as a removable storage device, a read-only memory (ROM, Read-Only Memory), a random access memory (RAM, Random Access Memory), a magnetic disk, or a compact disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for occlusion detection on a target object implemented by an electronic device, comprising:

determining, based on a pixel value of each pixel in a target image, first positions of a first feature and second positions of a second feature in the target image, the first feature being an outer contour feature of a target object in the target image, the second feature being a feature of an interfering subobject in the target object;

determining, based on the first positions, an image region comprising the target object;

connecting multiple pixels of the second positions in series to obtain a contour of the interfering subobject, and removing, according to the contour of the interfering subobject, the interfering subobject from the image region, to form at least two detection regions, wherein each detection region is closed and excludes the interfering subobject;

determining, according to a pixel value of a target detection region, whether the target detection region meets a preset unoccluded condition, the target detection region being any one of the at least two detection regions and excluding the interfering subobject;

determining that the target object is occluded when the preset unoccluded condition corresponding to any one of the at least two detection regions is not met; and determining that the target object is not occluded when determining that the preset unoccluded condition corresponding to each of the at least two detection regions is met.

2. The method according to claim 1, further comprising:
obtaining, by the electronic device, attribute information of the target object, wherein the attribute information comprises overall attribute information and regional attribute information, the overall attribute information represents an overall attribute of the target object, and the regional attribute information represents a regional attribute of the target detection region; and determining, by the electronic device according to the attribute information, at least one of a determining basis parameter or a determining policy, wherein the determining whether the target detection region meets the preset unoccluded condition comprises at least one of the following:

determining, by the electronic device according to the determining basis parameter and the pixel value of the target detection region, whether the target detection region meets the preset unoccluded condition; and determining, by the electronic device based on the pixel value of the target detection region, whether the target detection region meets the preset unoccluded condition by using the determining policy.

3. The method according to claim 2, wherein the determining, by the electronic device according to the determining basis parameter and the pixel value of the target detection region, whether the target detection region meets the preset unoccluded condition comprises:

determining, by the electronic device, a detection ratio of a quantity of pixels that are in the target detection region and that have pixel values in a same range to a total quantity of all pixels in the target detection region;

comparing, by the electronic device, the detection ratio with a preset ratio of the target detection region; and determining that the target detection region does not meet the preset unoccluded condition if the detection ratio is less than the preset ratio.

4. The method according to claim 2, wherein the determining, by the electronic device based on the pixel value of the target detection region, whether the target detection region meets the preset unoccluded condition by using the determining policy comprises at least one of the following:

obtaining, by the electronic device based on pixel values of edge pixels of the target detection region, a shape feature of the target detection region, and determining whether the shape feature corresponds to a preset shape; and determining, by the electronic device based on a pixel value of each pixel in the target detection region, a color feature in the target detection region, and determining whether the color feature meets a preset color condition.

5. The method according to claim 1, wherein the method further comprises at least one of the following:

when the electronic device is in a capturing mode of capturing the target image and detects that the target object is obstructed, outputting an adjustment prompt corresponding to the target detection region that does not meet the preset unoccluded condition; and outputting a replacement prompt for the target image when the electronic device is in a non-capturing mode and detects that the target object is obstructed.

6. The method according to claim 1, further comprising:
determining, by the electronic device according to an occluded status of the target image, that an unoccluded replacement image can be reconstructed based on the target image if the electronic device is in an automatic reconstruction mode and detects that the target object is occluded; and generating, by the electronic device, the replacement image based on the target image.

7. The method according to claim 6, wherein;
the at least two detection regions include two symmetrical detection regions; and
the generating, by the electronic device, the replacement image based on the target image comprises:
reconstructing, by the electronic device if one of the two symmetrical detection regions is occluded and the other one of the two symmetrical detection regions is not occluded, the target image based on the other one of the two symmetrical detection regions, to generate the replacement image.

8. The method according to claim 1, wherein
the target object is a face; and the second feature comprises: features of organs of the face.

9. The method according to claim 1, further comprising:
obtaining a dividing line by connecting the multiple pixels of the second positions in series; and
combining the dividing line and an edge line of the image region to obtain the at least two closed detection regions that excludes the interfering object.

10. An apparatus for occlusion detection on a target object, comprising:
a memory; and
a processor coupled to the memory and configured to:
determine, based on a pixel value of each pixel in a target image, first positions of a first feature and second positions of a second feature in the target image, the first feature being an outer contour feature of a target object in the target image, the second feature being a feature of an interfering subobject in the target object;
determine, based on the first positions, an image region comprising the target object;
connecting multiple pixels of the second positions in series to obtain a contour of the interfering subobject, and removing, according to the contour of the interfering subobject, the interfering subobject from the image region, to form at least two detection regions, wherein each detection region is closed and excludes the interfering subobject;
determine, according to a pixel value of a target detection region, whether the target detection region meets a preset unoccluded condition, the target detection region being any one of the at least two detection regions and excluding the interfering subobject;

determine that the target object is occluded when the preset unoccluded condition corresponding to any one of the at least two detection regions is not met; and determine that the target object is not occluded when determining that the preset unoccluded condition corresponding to each of the at least two detection regions is met.

11. The apparatus according to claim 10, wherein the processor is further configured to:

obtain attribute information of the target object, wherein the attribute information comprises overall attribute information and regional attribute information, the overall attribute information represents an overall attribute of the target object, and the regional attribute information represents a regional attribute of the target detection region; and determine, according to the attribute information, at least one of a determining basis parameter or a determining policy, and the processor is specifically configured to perform one of the following:

determining, according to the determining basis parameter and the pixel value of the target detection region, whether the target detection region meets the preset unoccluded condition; and determining, based on the pixel value of the target detection region, whether the target detection region meets the preset unoccluded condition by using the determining policy.

12. The apparatus according to claim 11, wherein the processor is further configured to:

determine a detection ratio of a quantity of pixels that are in the target detection region and that have pixel values in a same range to a total quantity of all pixels in the target detection region;

compare the detection ratio with a preset ratio of the target detection region; and determine that the target detection region does not meet the preset unoccluded condition if the detection ratio is less than the preset ratio.

13. The apparatus according to claim 11, wherein the processor is further configured to perform at least one of the following:

obtain, by the electronic device based on pixel values of edge pixels of the target detection region, a shape feature of the target detection region, and determine whether the shape feature corresponds to a preset shape; and determine, based on a pixel value of each pixel in the target detection region, a color feature in the target detection region, and determine whether the color feature meets a preset color condition.

14. The apparatus according to claim 10, wherein the processor is further configured to perform at least one of the following:

when the electronic device is in a capturing mode of capturing the target image and detects that the target object is obstructed, outputting an adjustment prompt corresponding to the target detection region that does not meet the preset unoccluded condition; and outputting a replacement prompt for the target image when the electronic device is in a non-capturing mode and detects that the target object is obstructed.

15. The apparatus according to claim 10, wherein the processor is further configured to:

determine, according to an occluded status of the target image, that an unoccluded replacement image can be reconstructed based on the target image if the electronic device is in an automatic reconstruction mode and detects that the target object is occluded; and generate the replacement image based on the target image.

16. The apparatus according to claim 15, wherein;

the at least two detection regions include two symmetrical detection regions; and the processor is further configured to:

reconstruct, if one of the two symmetrical detection regions is occluded and the other one of the two symmetrical detection regions is not occluded, the target image based on the other one of the two symmetrical detection regions, to generate the replacement image.

17. The apparatus according to claim 10, wherein:

the target object is a face; and the second feature comprises: features of organs of the face.

18. The apparatus according to claim 10, wherein the processor is further configured to:

obtain a dividing line by connecting the multiple pixels of the second positions in series; and combine the dividing line and an edge line of the image region to obtain the at least two closed detection regions that excludes the interfering object.

19. A non-transitory computer-readable storage medium, storing a computer program, the computer program, when being executed by a processor, causing the processor to perform:

determine, based on a pixel value of each pixel in a target image, first positions of a first feature and second positions of a second feature in the target image, the first feature being an outer contour feature of a target object in the target image, the second feature being a feature of an interfering subobject in the target object;

determining, based on the first positions, an image region comprising the target object;

connecting multiple pixels of the second positions in series to obtain a contour of the interfering subobject, and removing, according to the contour of the interfering subobject, the interfering subobject from the image region, to form at least two detection regions, wherein each detection region is closed and excludes the interfering subobject;

determining, according to a pixel value of a target detection region, whether the target detection region meets a preset unoccluded condition, the target detection region being any one of the at least two detection regions and excluding the interfering subobject;

determining that the target object is occluded when the preset unoccluded condition corresponding to any one of the at least two detection regions is not met; and determining that the target object is not occluded when determining that the preset unoccluded condition corresponding to each of the at least two detection regions is met.

20. The storage medium according to claim 19, wherein the computer program further cause the processor to perform:

obtaining a dividing line by connecting the multiple pixels of the second positions in series; and combining the dividing line and an edge line of the image region to obtain the at least two closed detection regions that excludes the interfering object.

* * * * *